LOW-FREQUENCY AMPLIFYING CIRCUITS WITH NEGATIVE FEEDBACK

Filed May 10, 1946

CAREL JAN VAN LOON.
HENRICUS ADRIANUS BROOS.
INVENTORS.

BY [signature]

ATTORNEY.

Patented Nov. 14, 1950 2,530,101

UNITED STATES PATENT OFFICE 2,530,101

LOW-FREQUENCY AMPLIFYING CIRCUITS WITH NEGATIVE FEEDBACK

Carel Jan van Loon and Henricus Adrianus Broos, Eindhoven, Netherlands, assignors, by mesne assignments, to Hartford National Bank and Trust Company, Hartford, Conn., as trustee Application May 10, 1946, Serial No. 668,710
In the Netherlands July 29, 1941

Section 1, Public Law 690, August 8, 1946
Patent expires July 29, 1961

7 Claims. (Cl. 179—171)

This invention relates to a low-frequency amplifying circuit with negative feed-back and manual volume control in which between the grid and the cathode of an amplifying tube is included the series connection of the adjustable portion of a potentiometer serving for the volume control and an impedance across which a degenerative voltage occurs, the circuit being such that the degree of negative feed-back increase with a downward control of the volume. Such circuits are used to avoid an undesirable reduction of the amplification, which occurs due to the degenerative coupling, in the transmission of weak signals (in which case the volume control device will be adjusted to the maximum volume). Such circuits have the drawback, however, that in the minimum position of the potentiometer the volume is not entirely reduced to zero.

According to the invention, in a circuit of the said kind this drawback is obviated by connecting the extremity of the potentiometer which is not connected to the impedance to the adjustable contact of a second potentiometer which has the voltages to be amplified supplied to it and of which one of the terminals is connected to the cathode of the amplifying tube, while the two potentiometers are controlled in the same sense by a common operating member.

Moreover, the circuit according to the invention offers an opportunity to provide an improved so-called physiological volume control, i. e. a volume control such that when the low-frequency energy produced by the amplifier decreases as a result of the downward control of the volume by displacing the adjustable contact of the potentiometer the oscillations of low frequency are attenuated to a considerably lower extent than those of high frequency.

According to the invention this improved physiological volume control is obtained by bridging at least one of the potentiometers in part by a frequency dependent network and supplying also the degenerative voltage to the impedance, which is connected in series with the potentiometer included in a grid circuit across a frequency dependent network.

Figure 1:
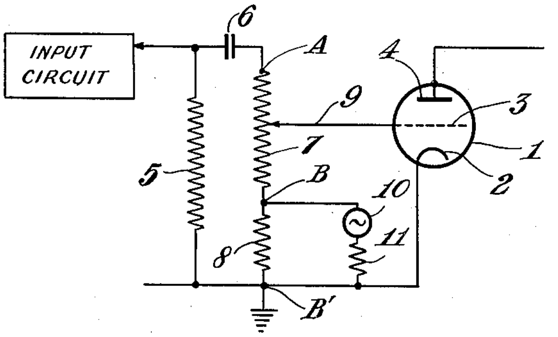
Figure 2:
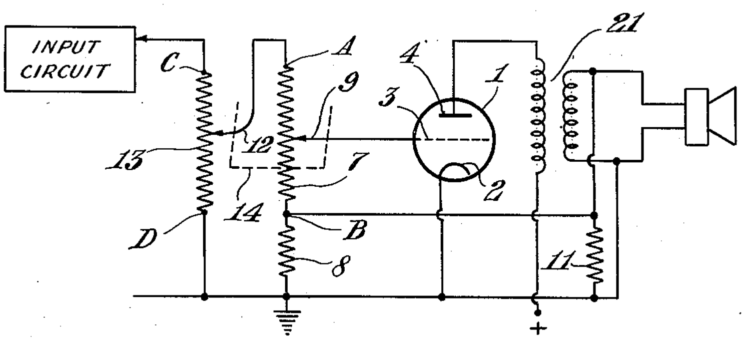
Figure 3:
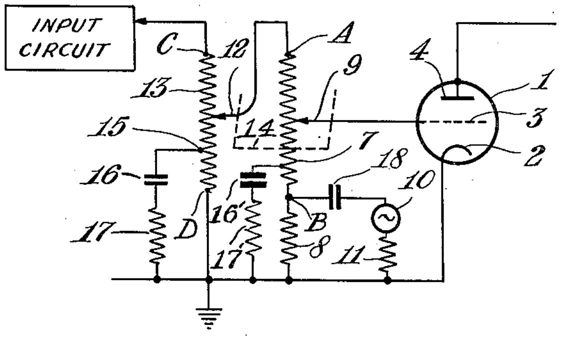
Figure 4:
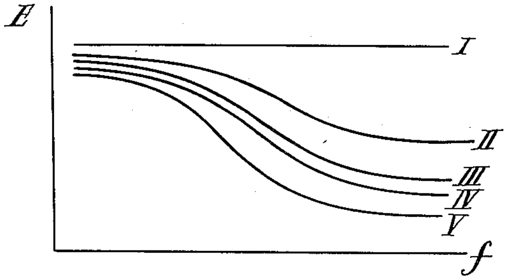

The invention will be set out more fully by reference to the following description and the accompanying drawing, in which Fig. 1 shows a known circuit and Figs. 2 and 3 show forms of construction of circuits according to the invention, whereas Fig. 4 shows a few curves relating to the circuits shown.

The known circuit represented in Fig. 1 has an amplifying tube 1, for example a triode, comprising a cathode 2, a grid 3 and an anode 4. The voltages to be amplified occur across a resistance 5 which may be, for example, the anode resistance of a preceding amplifying tube. Said voltages are supplied across a separating condenser 6 to the series connection of a potentiometer 7 and a resistance 8, the terminal of the resistance 8 which is not connected to the potentiometer 7, as well as the terminal of the resistance 5 which is not connected to the condenser 6 being earthed. The adjustable contact 9 of the potentiometer 7 is connected to the grid 3 of tube 1. The cathode 2 of tube 1 is earthed. The degenerative voltage supplied by a source 10 is supplied across the resistance 8 in the grid circuit of tube 1. Degenerative voltage source 10 is discussed more fully hereinafter in connection with Fig. 2. A resistance 11 is connected in series with the source 10 of degenerative voltage. Since the adjustable contact 9 moves between the terminals A and B of the potentiometer 7, it is evident that in the position of the potentiometer which corresponds to the minimum volume and in which the adjustable contact 9 is in point B the volume cannot be reduced to zero. It would be possible, it is true, to construct the resistance 8 as part of the potentiometer in such manner that the adjustable contact may be displaced as far as point B′, in which case the volume could be reduced to zero, but the negative feedback would then also decrease beyond point B and this is also undesirable.

Fig. 2 shows a circuit according to the invention in which the volume may be reduced to zero without the above-mentioned drawback occurring. This circuit corresponds in part to that of Fig. 1, the only difference being that the terminal A of potentiometer 7 is connected, whether or not via an impedance, e. g. a condenser or a resistance, to the adjustable contact 12 of a potentiometer 13, of which the point D is earthed, while the voltages to be amplified are supplied across the potentiometer 13, i. e. between the points C and D. Since point D is earthed and the contacts 12 and 9 are controlled by a common operating member, in this circuit no voltage is supplied to the grid of tube 1 in the position of the two potentiometers which corresponds to the coincidence of the adjustable contact 9 with point B and of the adjustable contact 12 with point D, so that in this circuit the volume may actually be reduced to zero. In this circuit a specific method of obtaining a feedback voltage corresponding to the source 10 of Fig. 1 is shown. More particularly, a feedback voltage is applied to the point B from the secondary winding of an output transformer 21 which voltage, in accordance with well known practice, is out of phase with the signal voltage derived from the potentiometer 13.

It is in addition known, in order to obtain a so-called physiological control, to provide a tapping on the potentiometer by which the volume is controlled and to connect this tapping, for example via a condenser and a resistance, to the low-tension end of the potentiometer. This known measure could also be applied to a circuit according to the invention and an example thereof is given in Fig. 3. Here the potentiometer 13 comprises a tapping 15 which is connected to the terminal D of the potentiometer via a condenser 16 and a resistance 17. It is evident that when the adjustable contact 12 is moved from point C to point D via the tapping 15, the voltage between the contact 12 and earth will decrease for oscillations of low frequencies to a comparatively lower extent than for oscillations of high frequencies. If no particular precautions are taken, however, the higher and the lower frequencies will decrease again to the same extent beyond the tapping 15. This is represented in the curves of Fig. 4 in which the output voltage E is shown as a function of the frequency $f$ in different positions of the adjustable contact of the potentiometer 13. The line I gives the frequency characteristic curve of the circuit with the maximum volume. The curve II is the frequency characteristic curve which corresponds to a position of the adjustable contact 12 between the points C and 15, the curve III gives the frequency characteristic curve when the adjustable contact has come just opposite the tapping 15, while the curve IV corresponds to a position of the adjustable contact 12 between the tapping 15 and the point D.

For a satisfactory physiological volume control it is desirable that also when the volume has decreased further, i. e., after the adjustable contact has passed point 15, the amplification of the low frequencies should decrease less rapidly than that of the higher frequencies. According to the invention, this may be achieved by supplying also the degenerative voltage to the amplifying tube across a frequency dependent network, which is constituted, for example, by a condenser 18 and a resistance 11. In this circuit the negative feedback for lower frequencies continuously decreases further according as the volume is smaller, which results in the intensity of the oscillations of lower frequencies becoming comparatively higher according as the volume is lower. With a correct choice of the components it is thus possible with a weak volume to obtain a frequency characteristic curve of the kind as is represented by curve V of Fig. 4. The negative feedback source 10, shown in Fig. 3, may be any conventional source of degenerative voltage, as shown, for instance, in Fig. 2.

A similar effect may be obtained by providing not only the potentiometer 13 with a tapping which is earthed via a condenser 16 and a resistance 17 but to apply the same measure to the potentiometer 7. This is illustrated in Fig. 3 wherein the series combination of a capacitor 16' and a resistor 17' are coupled between a tapping on potentiometer 7 and ground potential.

With a circuit of Fig. 3 which has ben used in practice highly satisfactory results were obtained if for each of the resistances 11 and 17 a value of 60,000 ohms, for the resistance 8 a value of 200,000 ohms and for the potentiometers 7 and 13 values of 800,000 ohms and 350,000 ohms respectively were chosen, while the condensers 16 and 18 were each 10,000 pf. In this case the negative feed-back of the high tones varied from threefold in the maximum position of the potentiometer to sixfold in the minimum position.

We claim:

1. An amplifying circuit arrangement comprising a first potentiometer member having a variable tapping, means to apply a signal voltage across said first potentiometer member, a second potentiometer member having a variable tapping, a fixed impedance element having one end thereof coupled to one end of said second potentiometer and having the other end thereof coupled to one end of said first potentiometer, means to couple the other end of the second potentiometer member to the variable tapping of the first potentiometer member, an output circuit coupled to the variable tapping of the second potentiometer, means coupled to said output circuit to apply said signal voltage in negative feedback relationship to the junction of said fixed impedance element and the end of said second potentiometer, and means to simultaneously vary the position of the said variable tappings of said potentiometers.

2. An amplifying circuit arrangement comprising a first potentiometer member having a variable tapping, means to apply a signal voltage across said first potentiometer member, a second potentiometer member having a variable tapping, a fixed impedance element having one end thereof coupled to one end of said second potentiometer and having the other end thereof coupled to one end of said first potentiometer, means to couple the other end of the second potentiometer member to the variable tapping of the first potentiometer member, an output circuit coupled to the variable tapping of the second potentiometer, means coupled to said output circuit to apply said signal voltage in negative feedback relationship to the junction of said fixed impedance element and the end of said second potentiometer, means to simultaneously vary the position of the said variable tappings of said potentiometers, and a frequency determining network having one end coupled to an intermediate tap on one of the potentiometer members, and the other end coupled to the junction of the first potentiometer and the fixed impedance element.

3. An amplifying circuit arrangement comprising a first potentiometer member having a variable tappng and a fixed intermediate tap, means to apply a signal voltage across said first potentiometer member, a second potentiometer member having a variable tapping, a fixed impedance element having one end thereof coupled to one end of said second potentiometer and having the other end thereof coupled to one end of said first potentiometer, means to couple the other end of the second potentiometer member to the variable tapping of the first potentiometer member, a frequency determining network coupled at one end to the fixed intermediate tap on the first potentiometer member and the other end coupled to the junction of the first potentiometer and the fixed impedance element, an output circuit coupled to the variable tapping of the second potentiometer, means coupled to said output circuit to apply said signal voltage in negative feedback relationship to the junction of said fixed impedance element and the end of said second potentiometer, and means to simultaneously vary the position of the said variable tappings of said potentiometers.

4. An amplifying circuit arrangement comprising a first potentiometer member having a variable tapping, means to apply a signal voltage across said first potentiometer member, a second potentiometer member having a variable tapping, a fixed impedance element having one end thereof coupled to one end of said second potentiometer and having the other end thereof coupled to one end of said first potentiometer, means to couple the other end of the second potentiometer member to the variable tapping of the first potentiometer member, an output circuit coupled to the variable tapping of the second potentiometer, means coupled to said output circuit to apply said signal voltage in negative feedback relationship through a frequency determining network to the junction of said fixed impedance element and the end of said second potentiometer, and means to simultaneously vary the position of the said variable tappings of said potentiometers.

5. An amplifying circuit arrangement comprising a first potentiometer member having a variable tapping and a fixed intermediate tap, means to apply a signal voltage across said first potentiometer member, a second potentiometer member having a variable tapping, a fixed impedance element having one end thereof coupled to one end of said second potentiometer and having the other end thereof coupled to one end of said first potentiometer, means to couple the other end of the second potentiometer member to the variable tapping of the first potentiometer member, a first frequency determining network coupled at one end to the fixed intermediate tap on the first potentiometer member and the other end coupled to the junction of the first potentiometer and the fixed impedance element, an output circuit coupled to the variable tapping of the second potentiometer, means coupled to said output circuit to apply said signal voltage in negative feedback relationship through a second frequency determining network to the junction of said fixed impedance element and the end of said second potentiometer, and means to simultaneously vary the position of the said variable tappings of said potentiometers.

6. An amplifying circuit arrangement comprising a first potentiometer member having a variable tapping and a fixed intermediate tap, means to apply a signal voltage across said first potentiometer member, a second potentiometer member having a variable tapping, a fixed impedance element having one end thereof coupled to one end of said second potentiometer and having the other end thereof coupled to one end of said first potentiometer, means to couple the other end of the second potentiometer member to the variable tapping of the first potentiometer member, a first frequency determining network, consisting of a capacitance and resistance connected in series, and coupled at one end to the fixed intermediate tap on the first potentiometer member and the other end coupled to the junction of the first potentiometer and the fixed impedance element, an output circuit coupled to the variable tapping of the second potentiometer, a second frequency determining network, means coupled to said output circuit to apply said signal voltage in negative feedback relationship through said second frequency determining network to the junction of said fixed impedance element and the end of said second potentiometer, and means to simultaneously vary the position of the said variable tappings of said potentiometers.

7. An amplifying circuit arrangement, comprising a first potentiometer member having a variable tapping and a fixed intermediate tap, means to apply a signal voltage across said first potentiometer, a second potentiometer member having a variable tapping and a fixed intermediate tap, a fixed impedance element having one end thereof coupled to one end of said second potentiometer and having the other end thereof coupled to one end of said first potentiometer, means to couple the other end of the second potentiometer member to the variable tapping of the first potentiometer member, a first frequency determining network, including a capacitance and resistance connected in series, and coupled at one end to the fixed intermediate tap on the first potentiometer member and coupled at the other end to the junction of the first potentiometer and the fixed impedance element, a second frequency determining network, including a capacitance and resistance connected in series, and coupled at one end to the fixed intermediate tap on the second potentiometer and coupled at the other end to the junction of the first potentiometer and the fixed impedance element, an output circuit coupled to the variable tapping of the second potentiometer, a third frequency determining network, means coupled to said output circuit to apply said signal voltage in negative feedback relationship through said third frequency determining network to the junction of said fixed impedance element and the end of said second potentiometer, and means to simultaneously vary the position of said variable tappings of said potentiometers.

CAREL JAN VAN LOON.
HENRICUS ADRIANUS BROOS.

REFERENCES CITED

The following references are of record in the file of this patent:

UNITED STATES PATENTS

| Number | Name | Date |
|---|---|---|
| 2,217,178 | Masters | Oct. 8, 1940 |
| 2,282,382 | Root | May 12, 1942 |
| 2,317,025 | Bond | Apr. 20, 1943 |
| 2,367,110 | Fayers | Jan. 9, 1945 |

FOREIGN PATENTS

| Number | Country | Date |
|---|---|---|
| 498,235 | Great Britain | Jan. 5, 1939 |